Feb. 7, 1967 — A. J. MORRIS — 3,302,627
INTERNAL COMBUSTION PISTON ENGINES
Filed Oct. 13, 1964 — 2 Sheets-Sheet 1

Inventor
Alberto Jorge Morris

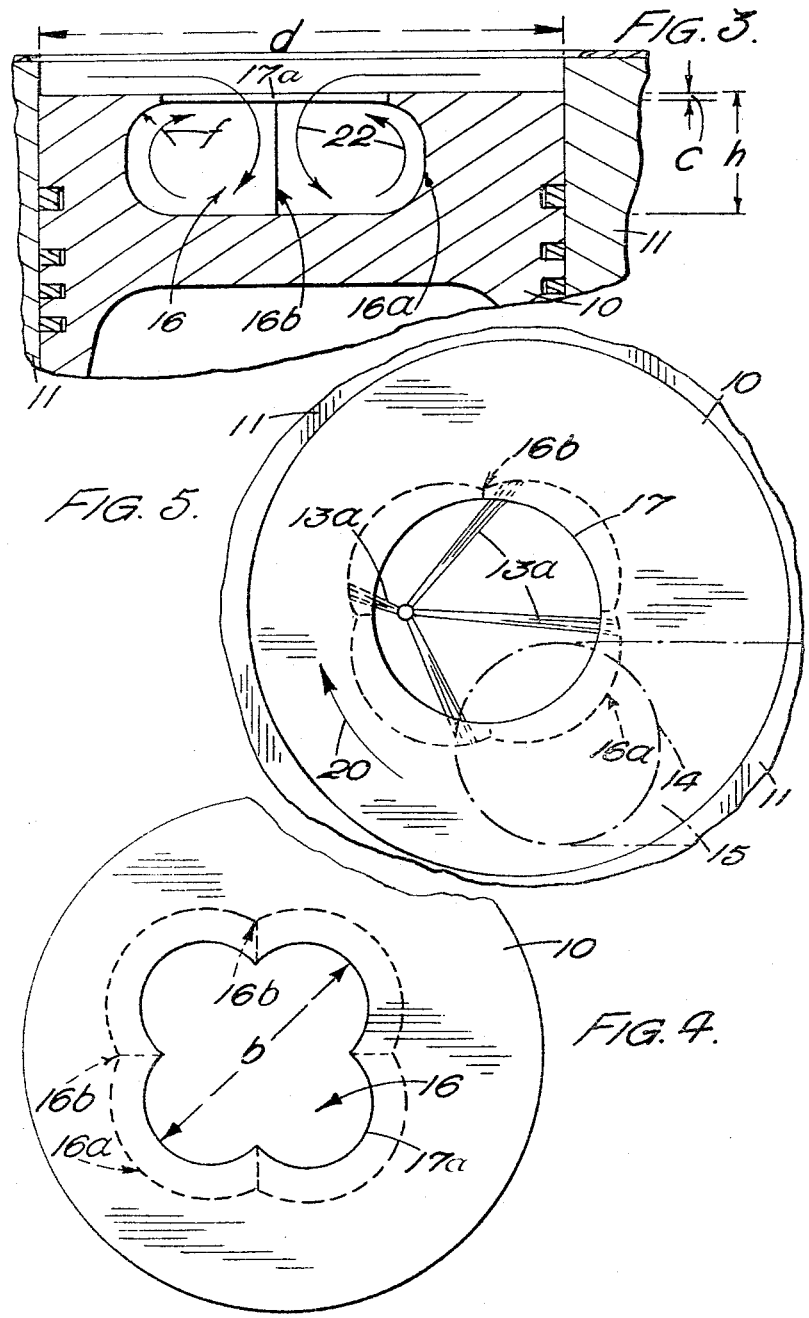

United States Patent Office 3,302,627
Patented Feb. 7, 1967

3,302,627
INTERNAL COMBUSTION PISTON ENGINES
Alberto Jorge Morris, Dursley, England, assignor to R. A. Lister & Company Limited, Dursley, England, a British company
Filed Oct. 13, 1964, Ser. No. 403,508
Claims priority, application Great Britain, Oct. 17, 1963, 41,124/63
11 Claims. (Cl. 123—30)

This invention comprises improvements in or relating to internal combustion piston engines of the class wherein the fuel is compression-ignited and the piston has a combustion chamber formed in its crown, which chamber has an entry orifice in the top surface of the crown for communicating with the cylinder space above the piston. Such a piston will be referred to as being of the class specified.

According to the present invention, a piston of the class specified has the boundary wall of the combustion chamber shaped, as by scalloping, to have a number of niches separated by projections towards the centre of the chamber. Thus, when air is caused to enter the chamber with a component of velocity tangential to the wall, the air tends inter alia to partake of a flow around the wall and to be deflected by the projections towards the centre of the chamber. A high turbulence is thus obtained which is desirable if good operating characteristics are to be achieved.

The wall may have two to eight such niches, the number being selected to be equal to the number of sprays of fuel produced by the liquid fuel injector employed to deliver fuel into the chamber. A fuel injector may have from two to eight spray orifices in its tip, but it is often preferred to use injectors having two, three or four such orifices.

The niches in the boundary wall may be formed by cylindrical surface portions which meet in cusp formations providing the projections towards the chamber centre.

The entry orifice of the chamber may be circular, or scalloped in conformity with the shape of the boundary wall of the chamber.

Some particular embodiments of the invention are shown in the accompanying drawings, in which—

Figure 1:
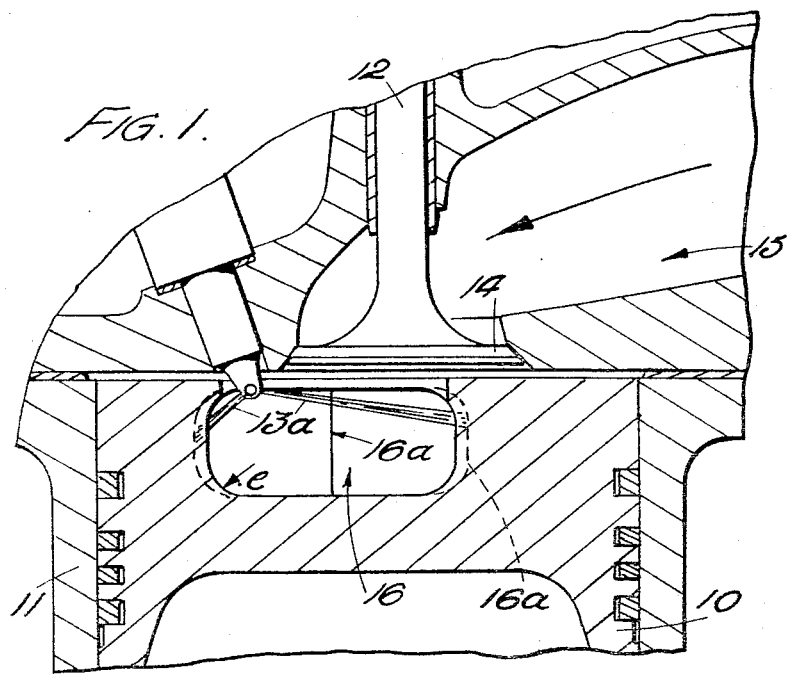
Figure 2:
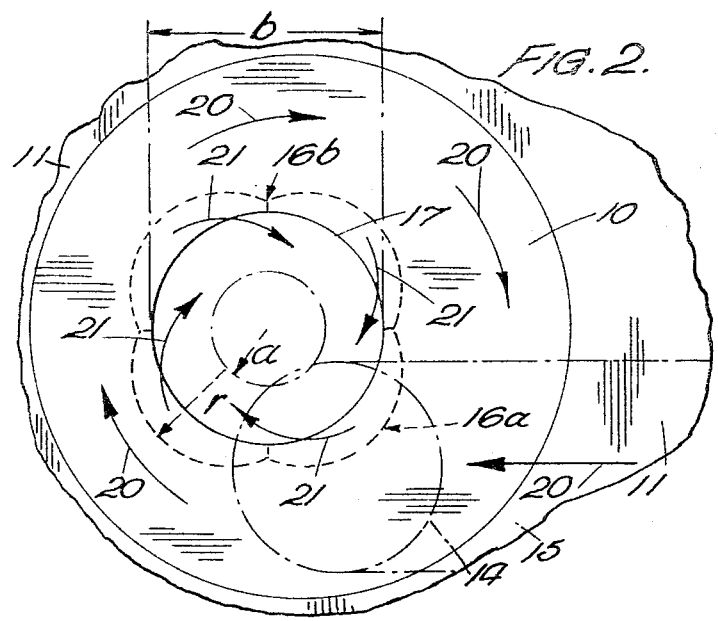

FIGURE 1 is a partial cross sectional view of an engine having a piston as above set forth, FIGURE 2 is a top plan view of the piston with a fragmentary view of adjacent cylinder portions, FIGURE 3 is another partial cross sectional view, similar to FIGURE 1, and showing the piston approaching top dead centre position, FIGURE 4 is a top plan view of another modification of the piston, and FIGURE 5 is a view like FIGURE 2 showing the fuel sprays.

Referring more particularly to the figures and initially to FIGURES 1–3 and 5, the engine comprises a piston 10 operating in a cylinder 11 having a cylinder head 12 in which are fitted a liquid fuel injector 13 and an inlet valve 14 controlling air flow from an inlet passage 15 into the engine cylinder space. In the form of the invention as better shown in FIGURE 5, the injector 13 produces four sprays of liquid fuel.

The piston 10 has a thick crown in which a combustion chamber 16 is formed communicating with the cylinder space above the piston 10 through orifice 17.

The boundary wall 16a of the chamber 16 is, as will be seen from either FIGURE 2 or 4, of a scalloped formation having part-cylindrical surface portions defining a plurality of niches separated by cusp-like projections 16b extending towards the centre of the chamber. The number of niches is equal to the number of sprays from the injector 13.

The orifice 17 may be circular as shown in FIGURE 2, or may have a scalloped form 17a similar to the cross sectional configuration of the boundary wall 16a of the chamber 16 as shown in FIGURE 4. The latter arrangement has the advantage that the orifice 17 can be machined at the same time as the boundary wall.

It will be noted from FIGURE 2 that air inlet passage 15 is set tangentially to the orifice 17 and to the cylinder 11, so that air entering the cylinder 11 above piston 10 flows as indicated by arrows 20 and so that air entering the chamber 16 tends to flow, substantially as indicated by arrows 21, with a velocity component around the niches and is deflected towards the chamber centre by the projections 16b.

Also as the piston rises to top dead centre, the air enters the chamber 16 and it is given a component of swirl basically as shown by arrows 22 in FIGURE 3.

The chamber 16 is located in the piston 10 either centrally or offset from the centre depending upon the layout of the valves and the injector.

The angular disposition of the point at which the fuel sprays from the injector 13 strike the walls of the niches varies in dependence on a number of factors including the height of the point of strike from the bottom of the chamber 16. The sprays are however conveniently kept within 30° of the projections 16b. In the case of the arrangement shown in FIGURES 1 to 3 and 5, the points of strike are about 5/16 inch below the top surface of the crown of the piston and are about 10° downstream of the nearest projection 16b considered in the direction of arrows 21.

Convenient dimensions of the piston chamber in terms of the piston diameter $d$ are as follows:

$$a = .06 \text{ to } .33d$$
$$b = .30 \text{ to } .60d$$
$$c = .005 \text{ to } .03d$$
$$e = .02 \text{ to } .15d$$
$$f = .02 \text{ to } .15d$$
$$h = .15 \text{ to } .3d$$
$$r = .1 \text{ to } .25d$$

The fuel injector nozzle 13 is placed either in the centre, or to one side of the combustion chamber.

The following is a table giving as decimal fractions of the piston diameter the corresponding dimensions of three pistons which give good results in use by ensuring great turbulence in the chamber 16. Great turbulence is desirable if a clean exhaust and a low fuel consumption are to be achieved.

|  | 3 niches | 4 niches | 4 niches |
|---|---|---|---|
| a | .069 | .070 | .074 |
| b | .385 | .47 | .5 |
| c | .0097 | .02 | .022 |
| e | .055 | .063 | .065 |
| f | .055 | .063 | .065 |
| h | .19 | .215 | .224 |
| r | .187 | .21 | .22 |
| Entry orifice | (¹) | (¹) | (¹) |

¹ Circular.

I claim:
1. A piston for an internal combustion engine, said piston comprising:
   (a) a single combustion chamber formed in the crown of the piston, the combustion chamber having:
   (b) an entry orifice in the top surface of the crown,
   (c) a flat bottom wall, and

(d) an encircling boundary wall formed with spaced projections directed away from the boundary wall towards the central zone of the chamber and providing a number of recesses separated by said projections;
(e) said projections extending full height of the encircling boundary wall, and
(f) said encircling boundary wall being undercut with respect to the entry orifice.

2. A piston according to claim 1 wherein the encircling boundary wall of the combustion chamber is scalloped.

3. A piston according to claim 2 wherein the encircling boundary wall has a plurality of concavely substantially cylindrical surface portions, said projections are cusp formations directed towards the central zone of the chamber and disposed generally at the intersections between said surface portions respectively, and adjacent ones of said surface portions meet at said cusp formations respectively.

4. A piston according to claim 1 comprising at least two and not more than eight of said recesses.

5. A piston according to claim 1 comprising at least three and not more than four of said recesses.

6. A piston according to claim 1 wherein the entry orifice is circular.

7. A piston according to claim 1 wherein the entry orifice is shaped in conformity with the shape of the encircling boundary wall of the combustion chamber.

8. An internal combustion engine comprising:
(a) a cylinder;
(b) a piston reciprocable in the cylinder;
(c) a single combustion chamber formed in the crown of the piston, said combustion chamber having:
(d) an entry orifice in the top surface of the crown:
(e) a flat bottom wall,
(f) an encircling boundary wall formed with projections directed away from the boundary wall towards the central zone of the chamber, and providing a number of recesses separated by said projections,
(g) said projections extending the full height of the encircling boundary wall, and
(h) said encircling boundary wall being undercut with respect to the entry orifice;
(i) a cylinder head mounted on the cylinder;
(j) a liquid fuel injector mounted in the cylinder head and delivering liquid fuel into said combustion chamber in the piston in the form of a plurality of sprays,
(k) the number of sprays being equal to the number of projections in the encircling boundary wall of the combustion chamber and being directed respectively to points on said boundary wall adjacent said projections; and
(l) an air inlet passage in the cylinder head, said passage opening into the cylinder to deliver air tangentially to the encircling boundary wall of the combustion chamber.

9. The combination according to claim 8 wherein said fuel injector sprays strike the boundary wall of said combustion chamber within 30° of said projections respectively.

10. The combination according to claim 8 wherein said fuel injector is positioned adjacent an edge of said orifice.

11. The combination according to claim 8 wherein the points of strike of said injector sprays at said boundary wall are all about the same distance below said piston orifice.

References Cited by the Examiner
UNITED STATES PATENTS

| 2,205,493 | 6/1940 | Saurer | 123—32 |
| 2,851,019 | 9/1958 | Fleming et al. | 123—32 |
| 2,881,743 | 4/1959 | Holt | 123—32 |
| 2,898,894 | 8/1959 | Holt | 123—32 |
| 3,144,008 | 8/1964 | List | 123—32 |

MARK NEWMAN, *Primary Examiner.*
LAURENCE M. GOODRIDGE, *Examiner.*